Nov. 21, 1967   H. ERDMANN ETAL   3,353,813
SHOCK ABSORBER FOR VEHICULAR SUSPENSION SYSTEMS
Filed Oct. 22, 1965   2 Sheets-Sheet 1

INVENTORS:
HANS ERDMANN
LEOPOLD FRANZ SCHMID

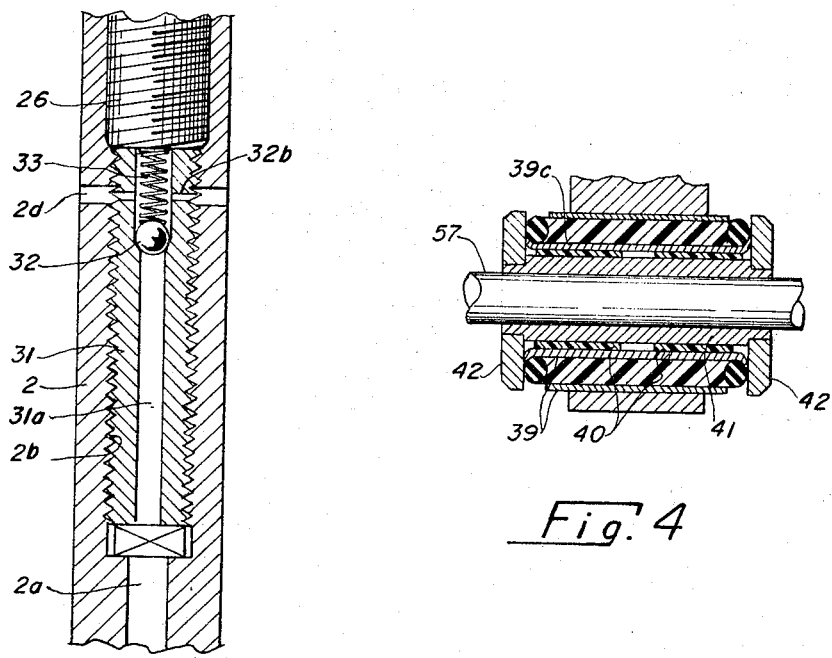

United States Patent Office 3,353,813
Patented Nov. 21, 1967

3,353,813
SHOCK ABSORBER FOR VEHICULAR
SUSPENSION SYSTEMS
Hans Erdmann, Frankfurt am Main, and Leopold Franz
Schmid, Stuttgart, Germany, assignors to Alfred Teves
Maschinen- und Armaturenfabrik KG.
Filed Oct. 22, 1965, Ser. No. 500,574
Claims priority, application Germany, Feb. 5, 1965,
T 27,944
19 Claims. (Cl. 267—8)

Our present invention relates to a shock absorber for vehicular suspension systems of the type wherein a pair of relatively movable members, such as a piston and a cylinder together constituting a dash-pot assembly, are displaceable from a normal relative position against the frictional resistance of a hydraulic fluid and against the restoring force of one or more biasing springs.

The cushioning effect of such a system depends upon the stiffness of the springs employed. With relatively short and stiff springs, impacts are transmitted without sufficient attenuation and a hard ride results, especially in the case of a partly loaded vehicle in which the springs—necessarily dimensioned to sustain a full load—are not in an optimum resonance condition with reference to the mass. Use of longer and softer springs, on the other hand, is often prevented by space considerations; moreover, such relatively long springs tend to balance the shock absorber in the case of a lightly loaded vehicle at an elevated level of support so that, for example, the rear part of the chassis will be raised or lowered with reference to the front part according to the number of rear-seat passengers and/or the weight of articles stored in the trunk. The resulting changes in the inclination of the vehicle also affect the position of the beams of its headlights at night; thus, these beams may illuminate only a short stretch of road if the rear of the car is high, whereas in the case of a heavily loaded trunk the light of the beams may blind oncoming drivers.

The general object of our present invention, therefore, is to provide an improved shock absorber of the type referred to in which the above-enumerated disadvantages are avoided.

It is also an object of our invention to provide a self-contained shock-absorber unit which does not require servicing and is independent of external fluid supplies.

A more particular object of this invention is to provide means responsive to changes in load for so varying the biasing of the resilient restoring means as to minimize resultant-level changes of the supported part of the vehicle.

A related object is to provide means in such system for sufficiently retarding the effect of load changes upon the equilibrium of the system to prevent overaccommodation leading to instability under certain driving conditions.

In accordance with our invention we realize the aforestated objects by the provision, in a resiliently biased dash-pot assembly as hereinabove described, of supplemental fluid-pressure-responsive means for reinforcing the restoring action of the associated biasing spring, the last-mentioned means being operatively coupled with one of the members of the dash-pot assembly for joint displacement therewith.

According to a more specific feature of our invention, the supplemental fluid-pressure-responsive means may include a hydraulic motor having a movable element rigidly connected with one of the anchors of the biasing spring so as to increase the stress of that spring, i.e., to compress it further in the case of an expanding coil spring, upon an increase in load.

According to a further feature of our invention, a leakage path for the return of fluid from the hydraulic motor to the supplemental fluid-pressure-responsive means, i.e., to a chamber enclosing an auxiliary plunger, is formed as a thread on the exterior of a tubular insert whose central bore forms part of the forward path for the fluid and advantageously contains a check valve to prevent a return flow through that bore.

Advantageously, in accordance with still another feature of our invention, the dash-pot assembly is disposed at the lower end of the shock absorber and is surrounded by a reservoir for hydraulic fluid, such as oil, from which a fluid-tight flexible envelope extends upwardly into engagement with the hydraulic motor so as to form an oil seal around the entire unit, thereby preventing losses of fluid and eliminating the need for periodic servicing or for connection of the system to an external fluid supply. The fluid reservoir may be separated from the space within the flexible envelope by an oil filter whereby any leakage oil accumulating within that space is purfied before being returned to the hydraulic circuit of the dash-pot assembly and of the associated fluid motor.

The invention will be described in greater detail in reference to the accompanying drawing in which:

FIGS. 2 and 3 are enlarged sectional detail views taken in the regions of FIG. 1 respectively designated II and III; and FIG. 4 is a cross-sectional view taken on the line IV—IV of FIG. 1.

Figure 1:
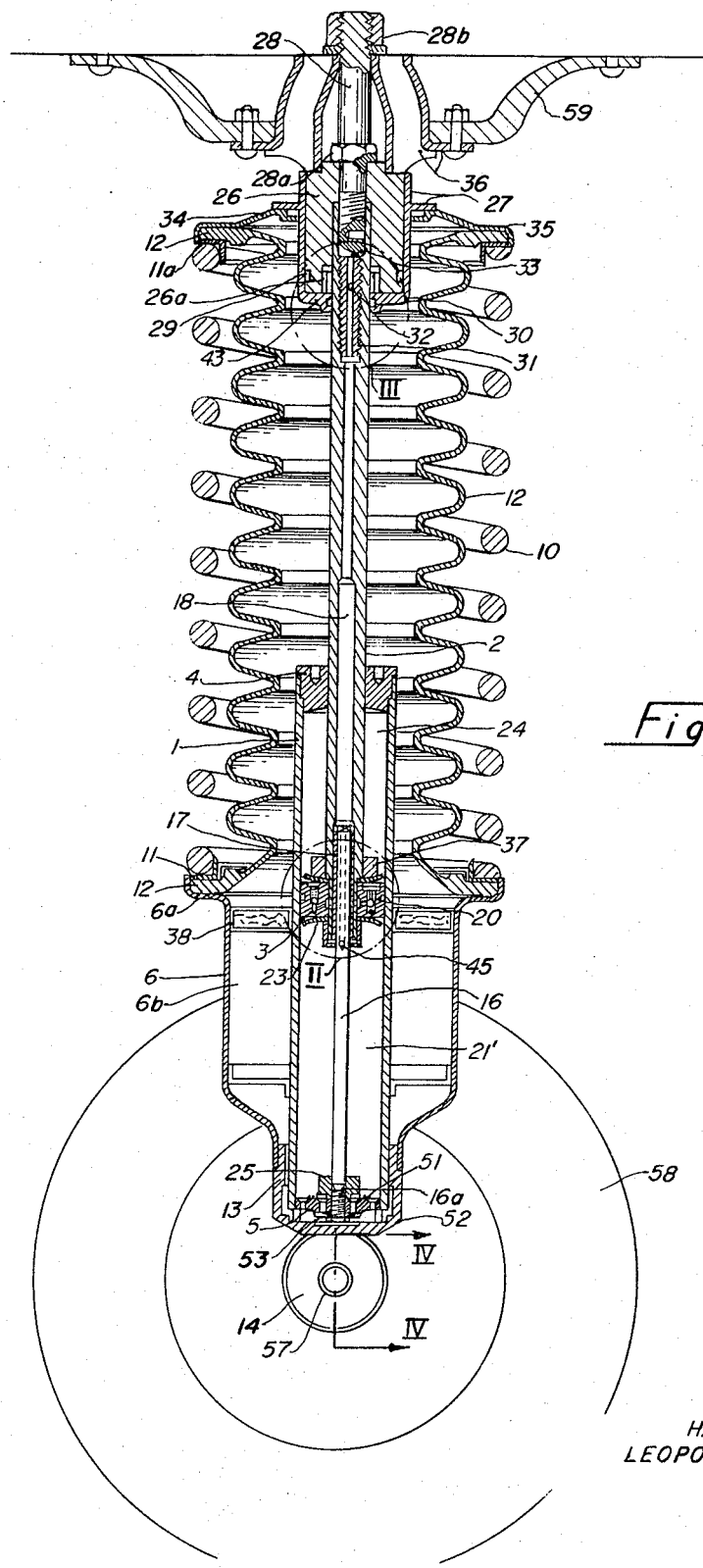
FIG. 1 is a sectional elevational view of a vehicular suspension system according to the invention.

The shock absorber shown in the drawing comprises a hydraulic cylinder 1 and a piston whose head 3 forms therewith a dash-pot assembly; a stem 2 of the piston rises from head 3 as a rigid extension thereof and passes through a perforated plug 4 constituting an upper end wall of the cylinder. The opposite end wall 5 is provided with several ports 51 through which the interior of the cylinder communicates with a surrounding oil reservoir 6 of annular configuration; other ports 52 in the cylinder wall 5 are yieldably obstructed by a resilient disk 53 and define therewith a bottom valve. End wall 5 of cylinder 1 also bears an internally threaded tubular boss 25 which is secured to it by a screw 9 to form a socket for the lower end of a plunger 16; an oil cushion 16a separates the plunger 16 from the screw 9.

Piston stem 2 is tubular and has its central bore 2a widened in its lower part to form a chamber 18 accommodating the upper end of plunger 16. This upper end is slidably guided in a bushing 15 which is maintained in position within the stem by a screw cap 54 and is formed with external longitudinal flutes 17 (best seen in FIG. 2) extending from the mid-plane of piston head 3 upwardly to the end of bushing 15 so as to be open toward the chamber 18. Flutes 17 communicate via radial bores 55 in stem 2 with an internal annular groove 56 of piston head 3 from which channels 22, 22' extend outwardly to accommodate respective check valves, i.e., a high-pressure valve 20 biased by a spring 19 and a suction-type valve 23 biased by a spring 19'. These valves are normally closed but open against the force of their respective biasing springs in response to above-normal pressure (valve 20) and below-normal pressure (valve 23) in the upper compartment 24 of cylinder 1, i.e., the space above piston head 3, valves 20 and 23 thus responding to an ascending and descending piston stroke, respectively, with reference to the surrounding cylinder. Plunger 16 is further formed at its upper end with a longitudinal bore 44 which terminates in a radial port 45 located, in the position of the unit illustrated in FIGS. 1 and 2, just below the piston 2, 3, 15 so as to establish a restricted fluid path from upper compartment 24 via check valves 20 and 23, passages 22 and 22', flutes 17, chamber 18 and bore 44 to the lower compartment 24' of cylinder 1 underneath piston head 3. This fluid path also includes a disk 46 with a throttling aperture overlying the valve 20, for a purpose explained hereinafter, and a perforated membrane 8 resiliently resting against the upper face of piston head 3 while being yieldable upwardly in a manner known per se against a curved stop plate 7 held in place by a collar 37. A similar but imperforate membrane 8' engages the lower face of piston head 3 and is downwardly yieldable against a stop plate 7' held in position by the screw cap 54.

The bottom of reservoir 6 is formed by an end cap 13 which threadedly engages the cylinder 1 and is rigid with a hub 14 accommodating a bearing 39 for an axle 57 of a vehicle wheel 58 suspended from a vehicular frame 59 by the shock-absorber leg illustrated in FIG. 1. The bearing 39, best seen in FIG. 4, comprises a metallic inner sleeve 39a, formed with anti-friction layers 40, e.g., of Teflon, by which it engages bushing 41 having end flanges 42 secured thereto in order to prevent entrance of dust and loss of lubricant. Frame or chassis 59 is attached by a resilient mounting 36 to the upper end of piston rod 2 and, with it, to a fixed part 26 of a hydraulic motor also having a movable part 27; in the embodiment illustrated, part 26 is designed as a piston whereas part 27 is a mating cylinder surrounding same. A bolt 28, provided with a hexagonal shoulder 28a, is secured to the mounting 36 by a nut 28b and bears with its shoulder upon motor piston 26 while having its lower end screwed into the internally threaded upper extremity of stem 2. This upper extremity, as best seen in FIG. 3, is traversed by an enlarged and internally threaded portion 2b of bore 2a, the threaded bore 2b forming a shoulder 2c as a seat for the bolt 28 and being occupied along almost the entire remainder of its length by a tubular insert 31 whose bore 31a constitutes an extension of bore 2a. The upper end of bore 31a is overlain by a check valve 32, loaded by a spring 33, and is widened in the region of a plurality of radial bores 32b which lead via aligned bores 2d of stem 2 to a set of passages 26a in piston 26. The passages 26a open at the lower face of the piston into a working space 43 formed between this face and the bottom wall of cylinder 27. Check valve 32 prevents the return of any fluid from space 43 to bore 2a; a leakage path, bypassing the valve 32, is constituted by the helical clearance between mating threads of bore 2b and insert 31.

A flange 34 on cylinder 27 bears upon a spring plate 35 having an inner annular flange 11a which serves as an upper anchor for a coil spring 10 coaxially surrounding the stem 2. The lower anchor for this spring is constituted by a ring 11 rigid with a flange 6a on reservoir 6. An accordion-pleated envelope or bellows 12 extends within the convolutions of spring 10 from flange 6a to spring plate 35 in order to form a fluidtight connection between the reservoir 6 and the hydraulic motor 26, 27. The enclosure thus constituted by envelope 12, reservoir 6 and cylinder 27 is substantially completely sealed and requires no special packing. Leakage oil entering the space within envelope 12 along the surface of stem 2, at the points where this stem passes through the plug 4 of cylinder 1 and the bottom wall of cylinder 27, accumulates on a filter disk 38 which closes the top of reservoir 6 and enables only filtered oil to return to the hydraulic circuit. This measure greatly increases the service life of our improved shock absorber.

In operation, the system according to our invention functions substantially in the manner of a conventional shock absorber as long as the chassis 59 is only partly loaded so that the piston 2, 3, 15 unblocks the port 45 of plunger bore 44; under these circumstances, the compartments 24, 24' of cylinder 1 communicate with each other via the aforedescribed path so that the piston and its cylinder act as a dash pot to damp the vibrations of spring 10 in response to road shocks.

If the load of the vehicle is increased so that port 45 is covered, a rise in wheel 58 and cylinder 1 relative to chassis 59 with upward entrainment of plunger 16 displaces the oil in chamber 18 so that fluid flows past the check valve 32 into the space 43 of hydraulic motor 26, 27 and forces the cylinder 27 thereof downwardly to increase the compression of spring 10. Since the contact between plug 4 and stem 2 is not absolutely fluidtight, air and/or oil may enter or leave the compartment 24 to make up for any deficiency or excess of fluid in that compartment. Naturally, if desired, piston head 3 may also be provided with additional restricted passages to interconnect compartments 24, 24' under these circumstances. The cushioning action of the shock absorber now proceeds with an effectively stiffened spring matching the increased load.

When the load is again reduced, oil slowly returns to the chamber 18 from space 43 via the leakage path formed by the threads of stem 2 and insert 31. The system thus returns gradually to the condition previously described.

Since the fluid-handling capacity of the leakage path depends on the viscosity of the oil and is therefore reduced at lower temperatures, it is desirable that fluid flow past valve 20 upon the expansion of spring 10 should be similarly temperature-dependent; this is the reason for the inclusion of the aforementioned throttling disk 46 in series with valve 20.

The pumping action of plunger 16 upon its entry into working chamber 18 is relatively limited in order that temporary increases in load should not lead to an objectionable buildup of spring pressure which could cause instability of the vehicle when passing over curved roads. In negotiating an S-curve, for example, the shock absorbers on the outside of the first bend are initially stressed so as to tend to increase the restoring force of their respective coil springs; when the vehicle next traverses the reversed second bend of the curve, these overstressed shock absorbers now lie inside the bend so as to reinforce the unbalancing effect due to the centrifugal force. This unbalancing effect is minimized by a dimensioning of chamber 18 and plunger 16 in a manner designed to spread the increase in spring stress over a considerable length of time.

We claim:

1. A vehicular suspension system comprising a dash-pot assembly with a hydraulic cylinder and a piston movable in said cylinder, said piston being provided with a restricted fluid passage; first anchor means rigid with said cylinder; second anchor means spaced from said first anchor means in line with said dash-pot assembly; expanding spring means bearing upon said first and second anchor means for maintaining same separated against the weight of a vehicle supported by the system; extensible link means interconnecting said piston and said second anchor means; and fluid-pressure-responsive means coupled with said dash-pot assembly for reducing the effective length of said link means to increase the stress of said spring means upon a movement of said anchor means toward each other by a relative motion of said piston and cylinder, said fluid-pressure-responsive means including a tubular stem forming an integral extension of said piston, said stem being part of said link means and having an axial bore defining a fluid chamber, a plunger in said chamber entrainable by said cylinder upon movement of the latter toward said second anchor means, and a hydraulic motor communicating with said chamber, said motor having a fixed part positively engaging said stem and a movable part positively engaging said second anchor means.

2. A system as defined in claim 1 wherein the bore of said stem is part of a channel for supplying hydraulic fluid from said chamber to said hydraulic motor under pressure of said plunger to displace said movable part toward said first anchor means.

3. A system as defined in claim 2 wherein said plunger passes through said piston and is provided with a venting passage communicating with said chamber and terminating at a location open to the interior of said cylinder under conditions of relatively light load but obstructed by said piston under conditions of relatively heavy load.

4. A system as defined in claim 2 wherein said channel includes a check valve preventing a return flow of fluid from said hydraulic motor to said chamber, said stem being further formed with a leakage path for returning fluid bypassing said check valve.

5. A system as defined in claim 4 wherein said stem has an internally threaded end remote from said piston and a tubular insert threadedly received in said end, said check valve being disposed in the interior of said insert, said leakage path being constituted by the internal threads of said end and mating threads of said insert.

6. A system as defined in claim 2 wherein said cylinder has an end wall remote from said second anchor means forming an abutment for said plunger.

7. A system as defined in claim 6 wherein said abutment is in the shape of a socket for an end of said plunger, said socket containing a fluid cushion.

8. A system as defined in claim 6 wherein said end wall is provided with at least one orifice leading to a fluid reservoir outside said cylinder.

9. A system as defined in claim 8 wherein said fluid passage connects said chamber with the interior of said cylinder on the side of said piston remote from said end wall.

10. A vehicular suspension system comprising a substantially vertical dash-pot assembly with a hydraulic cylinder and a piston movable in said cylinder, said piston being provided with a restricted fluid passage; lower anchor means rigid with said cylinder; upper anchor means spacedly disposed above said lower anchor means in line with said dash-pot assembly; expanding spring means bearing upon said lower and upper anchor means for maintaining same separated against the weight of a vehicle supported by the system; extensible link means interconnecting said piston and said upper anchor means; and fluid-pressure-responsive means coupled with said dash-pot assembly for reducing the effective length of said link means to increase the stress of said spring means upon a movement of said anchor means toward each other by a relative motion of said piston and cylinder, said fluid-pressure-responsive means including a rising tubular stem forming an integral upward extension of said piston, said stem being part of said link means and having an axial bore defining a fluid chamber, a plunger extending from below into said chamber and resting on a bottom wall of said cylinder for entrainment thereby upon upward movement of the latter, and a hydraulic motor communicating with said chamber, said motor having a fixed part positively engaging said stem and a movable part positively engaging said upper anchor means.

11. A system as defined in claim 10 wherein the bore of said stem is part of a channel for supplying hydraulic fluid from said chamber to said hydraulic motor under pressure of said plunger to displace said movable part downwardly with reference to said fixed part.

12. A system as defined in claim 11 wherein said bottom wall has at least one orifice, further comprising an annular fluid reservoir surrounding said cylinder and communicating with the interior thereof by way of said orifice.

13. A system as defined in claim 12, further comprising a flexible fluidtight envelope extending from said hydraulic motor to said reservoir.

14. A system as defined in claim 13 wherein said spring means comprises a coil spring surrounding said cylinder and said stem, said envelope being disposed within the convolutions of said coil spring.

15. A system as defined in claim 14 wherein said envelope is an accordion-pleated bellows.

16. A system as defined in claim 13 wherein said reservoir is provided with an oil filter separating it from the interior of said envelope.

17. A system as defined in claim 12 wherein said restricted fluid passage leads from an upper cylinder compartment above said piston to the interior of said stem, said plunger passing through said piston and being provided with a venting passage communicating with the interior of said stem and terminating at a location open to a lower cylinder compartment beneath said piston under conditions of relatively light load but obstructed by said piston under conditions of relatively heavy load.

18. A system as defined in claim 17 wherein said restricted fluid passage is constituted by at least one pair of bores provided with normally closed first and second valve means openable in response to above-normal and below-normal pressures, respectively, in said upper compartment.

19. A system as defined in claim 18, further comprising a disk on said piston, said disk being provided with a throttling aperture in line with said first valve means.

No references cited.

ARTHUR L. LA POINT, *Primary Examiner.*

R. M. WOHLFARTH, *Assistant Examiner.*